E. A. Cooper,
Hame Fastener.
No. 86,137.
Patented Jan. 26, 1869.
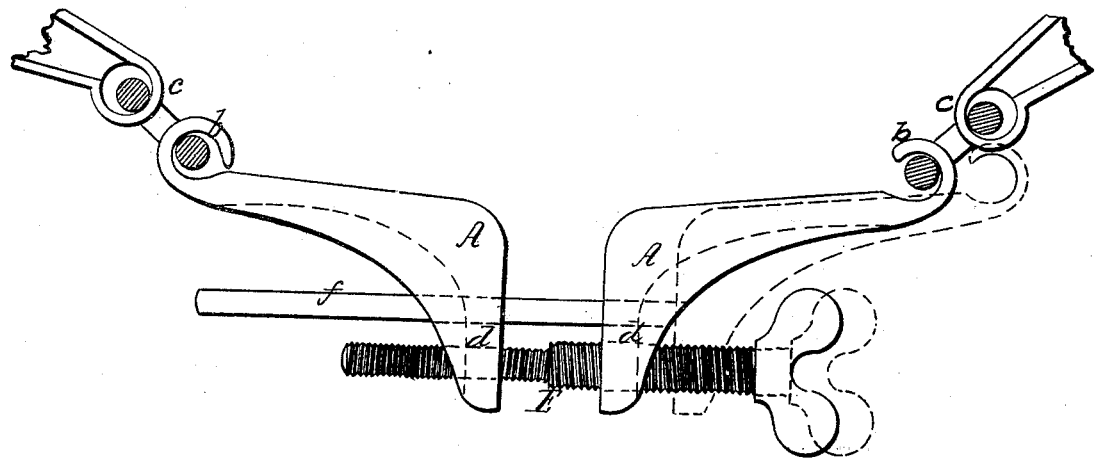
Witnesses;
Edward Wilhelm,
Victor H. Becker
Inventor;
E. A. Cooper
by Forbush & Wyatt

EDWARD A. COOPER, OF BUFFALO, NEW YORK.

Letters Patent No. 86,137, dated January 26, 1869.

IMPROVED HAMES-FASTENER.

The Schedule referred to in these Letters Patent and making part of the same.

*To all whom it may concern:*

Be it known that I, EDWARD A. COOPER, of the city of Buffalo, in the county of Erie, and State of New York, have invented a certain new and improved Metallic Hames-Fastener; and I do hereby declare that the following is a full and exact description thereof, reference being had to the accompanying drawing.

My improved fastener consists of two similar metallic pieces, each provided with a hook at one end, to engage with the hames, and a lug at the other, through which passes a screw-bolt, provided with a thumb-piece, by which the parts are drawn together, or distended, as required for fastening or detaching the hames.

In the drawing, which represents a front elevation—

A A are the two halves of the coupling, preferably made of malleable cast-metal.

b, the hooks, and d, the lugs thereof.

E is the screw-bolt connecting these lugs.

This screw is formed with a right-hand thread for one half of its length, and a left-hand thread for the other half, which traverse respectively through the two ears d.

By this construction of the screw, the parts A A of the fastening are made to approach or recede from each other with twice the rapidity with which they would if only a single thread, screwing through one of the lugs, were employed.

By making that half of the screw next to the thumb-piece a little larger than the other half, the thumb-piece can be formed with the screw in one piece and both threads be cut from the same end. This will permit the ready insertion of the screw, the smaller end thereof passing through the larger screw-hole before engaging with the one in the opposite lug.

My improved fastener is applied and used in the following obvious manner:

One of the hooks, b, is preferably permanently connected with the loop c at the end of one of the hames, by closing the hook around the loop.

The hames being adjusted on the collar, the hook at the opposite end of the fastener is engaged with the loop of the other hames, when, by giving the bolt E a few turns, the parts are quickly brought together, each half of the screw traversing its respective ear. By reversing the screw, the hames are as quickly released, as shown in red lines.

A guide-pin, f, may be attached to one lug, and extend through and slide in a hole in the opposite lug, which will serve to keep the two parts of the coupling in their proper relative position, although its use is not essential.

It is manifest that an ordinary screw-bolt, with a thread at one end only, may be employed, which will perform the same functions of the screw E as above described, but not so expeditiously.

What I claim as my invention, and desire to secure by Letters Patent, is—

The combination of the parts A A and screw-bolt E, substantially as and for the purpose set forth.

EDWARD A. COOPER.

Witnesses:
JAY HYATT,
GEO. W. WALLACE.